United States Patent [19]
Parker et al.

[11] 3,775,004
[45] Nov. 27, 1973

[54] VIEW SCREEN MICROSCOPES

[75] Inventors: Bernard I. Parker, Warren; Charles W. Caldwell, Cortland, both of Ohio

[73] Assignee: Parco Scientific Co., Warren, Ohio

[22] Filed: May 11, 1971

[21] Appl. No.: 142,157

[52] U.S. Cl. .............................................. 353/39
[51] Int. Cl. ......................................... G02b 21/36
[58] Field of Search .................... 353/39, 74–78, 353/101; 350/86, 87

[56] References Cited
UNITED STATES PATENTS

| | | | |
|---|---|---|---|
| 2,548,554 | 4/1951 | Nivison | 353/78 |
| 3,205,770 | 9/1965 | Koch | 353/39 |
| 3,229,570 | 1/1966 | Erban | 353/39 |
| 2,401,224 | 5/1946 | Burton | 353/39 |
| 3,259,012 | 7/1966 | Locquin | 350/87 |
| 2,427,256 | 9/1947 | Butschen | 353/39 |
| 2,552,238 | 5/1951 | Turner | 353/39 |

Primary Examiner—Louis R. Prince
Assistant Examiner—A. J. Mirabito
Attorney—Michael Williams

[57] ABSTRACT

A new view screen microscope comprising a base structure supporting a stage plate and an optical system, and a hollow elbow-shaped housing mounted on the top of the base structure and supporting reflecting mirrors and a screen plate on which the magnified image of a specimen on the stage plate is displayed.

The housing is rotatably mounted on the base structure and the latter comprises a base and a bridge formed by a plurality of legs, the lower ends of which are connected to the base and the upper ends of which are joined to form a ledge to which the hollow housing is connected.

6 Claims, 5 Drawing Figures

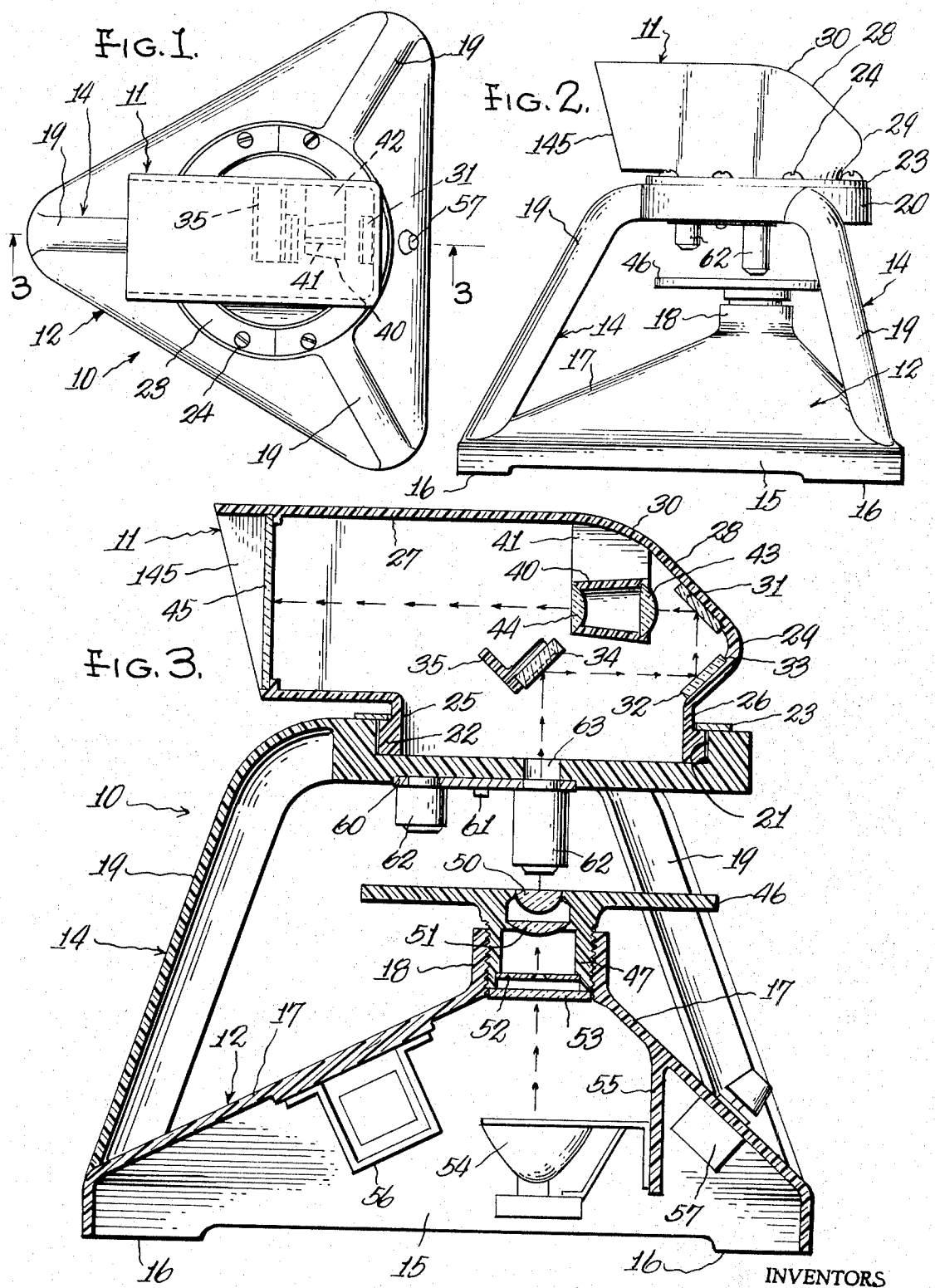

INVENTORS
BERNARD J. PARKER
CHARLES W. CALDWELL

BY Michael Williams
ATTORNEY 3,775,004

VIEW SCREEN MICROSCOPES

BACKGROUND AND SUMMARY

Most of the view screen microscopes of the prior art known to use are made of conventional construction, including parts which require accurate machining and thus are relatively expensive to manufacture.

Our invention enables a reduction in cost of manufacture of view screen microscopes by reason of the fact that major components may be made in quantity by plastic molding techniques, yet without sacrificing in quality of manufacture.

Further, our improved view screen microscope possesses stability in support, ease of operation and esthetic appeal, not possible with conventional units. Also, since the housing carrying the viewing screen is rotatably supported, it may be swung to enable a plurality of persons around the instrument to view the projected image.

Accordingly, it is the principal object of our invention to provide new and improved view screen microscopes possessing all the advantages of conventional units, and certain additional advantages, but without the disadvantages of such conventional projectors.

DESCRIPTION OF THE DRAWINGS

In the drawings accompanying this description and forming a part of this specification, there is shown, for purpose of illustration, an embodiment which our invention may assume, and in these drawings:

FIG. 1 is a top plan view of our improved view screen microscope,

FIG. 2 is a side elevational view thereof, and

FIG. 3 is an enlarged sectional view corresponding generally to the line 3—3 of FIG. 1.

DESCRIPTION OF THE PREFERRED EMBODIMENT

Figure 4:
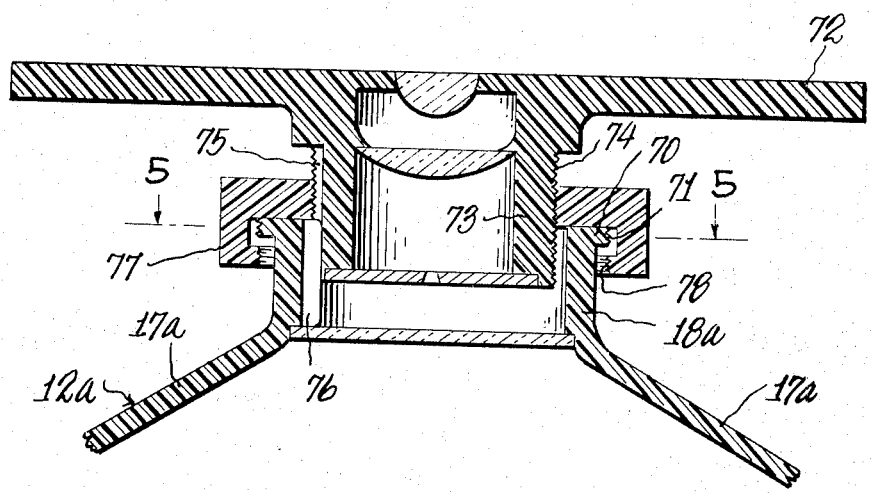
FIG. 4 is an enlarged, fragmentary sectional view of the stage plate, showing a different type of adjustment therefor.

Our view screen microscope comprises a base structure 10 and a hollow housing 11 supported at the top of the base structure. As herein shown, the housing has a swivel connection with the base structure so that it may be rotated relative thereto.

The base structure 10 comprises a base 12 and a bridge 14, both of which are preferably made of a high strength, high impact plastic, and may be molded in quantity production. The housing 11 may also be molded of a similar material.

As herein shown, the base 12 is triangular in plan, although it may take any other suitable shape. The base 12 comprises a lower skirt portion 15 formed with feet 16 at the three corners. The upper portion of the base is formed of upwardly and inwardly sloping walls 17 which merge in a cylindrical neck 18.

The bridge 14 includes three legs 19 (when the base is triangular), each leg being generally U-shaped in cross-section. The lower part of each leg is formed to closely follow the contour of a respective corner of the base and each lower part is connected to the base, preferably by means of a suitable cement. The upper parts of the legs merge into an integral ledge 20. The base and bridge, as thus connected, form a sturdy support for the entire assembly.

The ledge 20 is formed with an annular recess 21 extending inwardly from its upper surface to closely receive an annular ring 22 formed as an integral part of the hollow housing 11. The ring is held seated within the recess 21 by means of a ring-like plate 23 which is held to the upper surface of the ledge by screws 24 and which has its inner peripheral portion overlying the upper surface of the ring 22. The plate 23 is made in two pieces so that it may be easily assembled. The dimensional tolerance between the ring 22 and the wall of the recess is such that the housing 11 is held to accurate but relatively free rotation.

The hollow housing 11 is generally elbow-shaped and has an opening 25 defined by the inner peripheral surface of the ring 22. The housing has an upright portion 26 extending upwardly from the ring 22 and a portion 27 extending at right angles to the portion 26. The housing portion 27 is generally rectangular in plan view, as seen in FIG. 1 and has an inclined rear wall 28 which merges with the portions 26 and 27 by means of curved walls 29 and 39, respectively.

As best seen in FIG. 3, the housing has a pair of angularly related mirrors, prisms or other reflective surfaces 31, 32 secured in vertically spaced relation on opposite sides of the curved wall 29 and the inner surface of the latter may have ledges 33 to locate the mirrors. Preferably, the mirrors 31, 32 are cemented in place. The mirror 32 is accurately located relative to a mirror or other reflective surface 34 and the latter is carried by a projection 35 which extends from a side wall of the housing 11, as shown in FIG. 1. The projection is angle-shaped in cross-section for strength and to provide a ledge to accurately locate the mirror 34, and the latter may be cemented to the projection. The projection 35 may be integral with the housing side wall, if molding practices permit, or it may be cemented to the side wall. The mirror 34 is disposed at the center of rotation of the housing 11 so that it will at all times be positioned to reflect light rays to the mirror 32 regardless of the rotational position of the housing 11.

A conical tube 40 is disposed within the housing 11 and is axially aligned with light rays reflected by the mirrors 31. The tube has struts 41, 42 which respectively extend from the top and a side of the tube and are connected, either integrally or by cementing, to the respective top and side wall of the housing. Two plano-convex lenses 43, 44 are carried by the tube at respective ends thereof and light rays reflected from the mirror 31 pass through the lens 43, 44 (which correspond to the eye piece lens of a microscope) and are projected onto a screen plate 45 which extends cross-wise of the housing portion 27 adjacent to the opening 145. The screen plate may be formed of any suitable material which will arrest and display the magnified image of the article being examined, and a suitable material is commercially known as Polacote Lenscreen.

A stage is supported from the base 12 and in the present embodiment comprises a circular plate 46 preferably formed of plastic material. The plate has a downwardly extending tubular boss 47 which is exteriorly threaded to cooperate with interior threads formed in the neck 18. Thus, the stage may be adjusted upwardly or downwardly by proper rotation relative to the base.

A condensing lens 50 is disposed within a central opening of the stage plate 46, and a condensing lens 51 is disposed below the lens 50 and is supported within the tubular boss 47. Below the lens 51, and also supported within the boss 47, is an opaque disk 52 having a central opening. A dispersing lens 53 is supported at the lower end of the tubular boss 47.

A lamp 54 is carried by a wall 55 integral with and extending downwardly from the base wall 17 in position to reflect light rays upwardly through the lens system above described. The lamp may be of any suitable commercially available type and in the present embodiment is a quartz lamp. A transformer 56 is supported from the lower surface of the base wall 17 and a manually operable switch 57 is connected in electrical circuit with the transformer 56 and lamp 54 to control flow of electrical energy thereto from a suitable source.

A circular plate 60 is rotatably supported from the under-surface of the ledge 20, as by means of a screw 61. The plate 60 supports a plurality objective lens holder 62 of varying magnification powers. The construction is such that any selected lens holder may be brought into alignment with the central opening 63 of the ledge 20.

Figure 5:
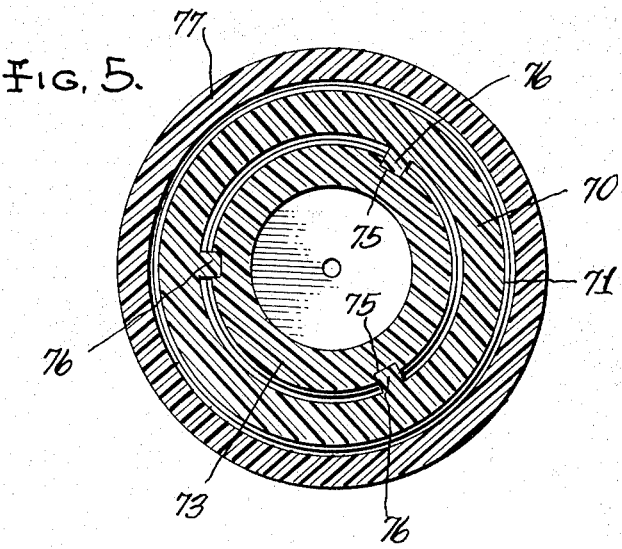
FIG. 5 is a transverse section corresponding to the line 5—5 of FIG. 4.

In the construction shown in FIGS. 4 and 5, the stage may move adjusted vertically but is held against rotation. As before, the base 12a has upwardly and inwardly sloping walls 17a which merge in a cylindrical neck 18a. The upper part of the neck has a circular flange 70 which is exteriorly threaded at 71 for a purpose to appear.

The stage comprises a plate 72, which may be circular or any other desired shape. As before, the plate has a downwardly extending cylindrical boss 73 provided with exterior screw threads 74. The boss is formed with a plurality of keyways 75 (three shown in the drawing) to closely receive corresponding keys 76 on the interior of the neck 18a. The keys may be formed integrally with the neck or may be separately attached to the neck. Further, if the keys are separately attached to the neck, provision may be made in any suitable manner for their adjustment toward or away from the boss 73 to insure snug, yet slidable, engagement between the keys and their respective keyways.

A cap nut 77, which may be formed of plastic or metal, has interior threads which are complementary to the threads 74 on the boss 73, so that as the nut is rotated, the stage is moved vertically, the cooperating keys and keyways permitting such vertical movement but holding the stage against rotation. The cap nut has an inwardly directed flange 78 formed with interior threads which are complementary to the threads on the boss flange 70. The flange 78 is spaced from the head portion of the nut a distance greater than the thickness of the boss flange 70 so that it may be threaded over the latter for assembly or disassembly, and beyond the latter, as shown in the drawing, to permit free rotation of the cap nut.

We claim:

1. A view screen microscope, comprising:
a base,
a bridge including a plurality of legs fixed at their lower ends to said base,
said legs extending upwardly and inwardly from their lower ends and terminating in a fixed boss having an upwardly opening cylindrical recess therein,
said boss recess having an aperture centrally thereon,
a stage plate disposed within said legs and beneath said aperture,
means mounting said stage plate on said base for vertical adjustment with respect thereto,
a lens system cooperatively associated with said stage plate and in optical alignment with said aperture,
a hollow housing having one open end provided with a cylindrical ring whch is rotatably seated within said boss cylindrical recess and about said aperture,
said housing having optical means therein for directing light rays from lens system through said housing to another open end thereof, and,
a screen plate disposed across said housing adjacent said other open end thereof for arresting and displaying an image projected thereon by said optical means, said optical means and said lens system being constructed and arranged to provide for the display of said image in any rotated position of said housing.

2. The construction of claim 1 wherein said base is provided with a neck and said stage plate is provided with a cylindrical boss formed with exterior screw threads, a nut connected to said neck for rotation and having interior screw threads complementary to the threads on said boss so that said stage plate is moved vertically when said nut is rotated, and means in part carried by said neck and in part carried by said boss, cooperating to hold said stage plate against rotation as it is moved vertically.

3. The construction of claim 2 wherein said last named means comprises a plurality of vertically extending keys carried by and extending inwardly of said neck and mating with corresponding keyways formed on said boss.

4. The construction according to claim 1 wherein said housing is elbow-shaped and has a mirror therein positioned on the axis of rotation of said housing but angularly related to said axis,
and a pair of angularly related mirrors spaced apart at the inner surface of said elbow, one to receive light rays reflected by the mirror on the axis of rotation and the other to receive light rays reflected by said one mirror and to reflect the same to said screen plate.

5. The construction according to claim 4 and further including an optical lens system between said other mirror and said screen plate through which light rays pass on their way to said screen plate.

6. The view screen microscope of claim 1 wherein said boss has rotatably mounted thereon on the underside thereof a plurality of objective lenses for selective alignment with said aperture

* * * * *